US012509919B2

(12) United States Patent
Nakashima et al.

(10) Patent No.: US 12,509,919 B2
(45) Date of Patent: Dec. 30, 2025

(54) VEHICLE DOOR LOCK DEVICE

(71) Applicant: HONDA MOTOR CO., LTD., Tokyo (JP)

(72) Inventors: Atsushi Nakashima, Tokyo (JP); Mitsunori Nishino, Tokyo (JP); Toshihiro Kaneda, Tokyo (JP); Akira Kamikura, Tokyo (JP); Riki Toyooka, Tokyo (JP); Makoto Ono, Tokyo (JP); Tsukasa Kishida, Tokyo (JP); Koji Masuda, Tokyo (JP); Koji Nomura, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 80 days.

(21) Appl. No.: 18/588,045

(22) Filed: Feb. 27, 2024

(65) Prior Publication Data

US 2024/0328212 A1 Oct. 3, 2024

(30) Foreign Application Priority Data

Mar. 30, 2023 (JP) ................................ 2023-054713

(51) Int. Cl.
*E05B 77/26* (2014.01)
*E05B 77/28* (2014.01)
(Continued)

(52) U.S. Cl.
CPC .............. *E05B 77/26* (2013.01); *E05B 77/28* (2013.01); *E05B 81/58* (2013.01); *E05B 81/74* (2013.01); *E05B 81/06* (2013.01)

(58) Field of Classification Search
CPC .......... E05B 77/26; E05B 77/28; E05B 81/58; E05B 81/74; E05B 81/06
See application file for complete search history.

(56) References Cited

U.S. PATENT DOCUMENTS 6,037,727 A * 3/2000 Kawanobe .............. E05F 15/70 318/446
11,746,575 B2 * 9/2023 Cervone ................. E05B 85/16 292/336.3
(Continued)

FOREIGN PATENT DOCUMENTS

JP H10-140899 A 5/1998
JP 2005-273173 A 10/2005
(Continued)

OTHER PUBLICATIONS

Japanese Office Action received in corresponding Japanese application No. 2023-054713 dated Jan. 21, 2025 with English translation (6 pages).

*Primary Examiner* — Mark A Williams
(74) *Attorney, Agent, or Firm* — Rankin, Hill & Clark LLP

(57) ABSTRACT

A vehicle door lock device for a door of a vehicle includes: a mechanical changeover mechanism switchable between a mechanical lock mode in which a motion of a door handle lever is not transmitted to a latch and a mechanical unlock mode in which the motion of the door handle lever is transmitted to the latch; an actuator capable of causing the mechanical changeover mechanism to switch from the mechanical unlock mode to the mechanical lock mode; and a controller configured to control the actuator. The controller is configured to, when the controller has determined that any one of a plurality of conditions for re-locking is met and the mechanical changeover mechanism has switched from the mechanical lock mode to the mechanical unlock mode, immediately activate the actuator to cause the mechanical changeover mechanism to switch from the mechanical unlock mode to the mechanical lock mode.

5 Claims, 5 Drawing Sheets

(51) Int. Cl.

| | |
|---|---|
| ***E05B 81/58*** | (2014.01) |
| ***E05B 81/74*** | (2014.01) |
| *E05B 81/06* | (2014.01) |

(56) References Cited

U.S. PATENT DOCUMENTS

2003/0025337 A1* 2/2003 Suzuki .................... E05B 83/40
292/201
2003/0184098 A1* 10/2003 Aiyama .................. E05B 81/78
292/216
2005/0218660 A1* 10/2005 Ijuin ....................... E05B 77/26
292/201
2010/0117381 A1* 5/2010 Sung ....................... E05B 17/10
292/336.3
2014/0327252 A1* 11/2014 Sobecki .................. E05B 5/006
292/336.3
2019/0368236 A1* 12/2019 Sakakura ................... B60J 5/00
2020/0392764 A1* 12/2020 Konchan ................. B60R 25/20

FOREIGN PATENT DOCUMENTS

JP 2008-144418 A 6/2008
JP 2009-013719 A 1/2009
JP 2018-134887 A 8/2018
JP 2022-123431 A 8/2022

* cited by examiner

VEHICLE DOOR LOCK DEVICE

CROSS REFERENCE TO RELATED APPLICATIONS

This application claims foreign priority to Japanese Patent Application No. 2023-054713, filed Mar. 30, 2023, the disclosure of which is incorporated herein by reference in its entirety.

TECHNICAL FIELD OF THE INVENTION

The present invention relates to a vehicle door lock device that performs latch control.

BACKGROUND ART

Efforts have been made in recent years to provide access to sustainable transportation systems friendly to vulnerable traffic participants, such as elderly people and children. To achieve the aim, the efforts are focusing on research and development to further improve the safety and convenience of traffic through development aimed at improving the ease of getting in and out of a vehicle.

In such efforts, proposals have been made for door lock device including an automatic changeover mechanism that allows performing lock and unlock operations by an electronic operation and a manual changeover mechanism that allows those operations by manual operations.

For example, Japanese Patent Application Publication No. 2022-123431 proposes a method of preventing a door from opening with a timing not intended by the user due to an action of an automatic changeover mechanism during a manual operation on a door handle lever.

SUMMARY

Incidentally, in the case of the method proposed in Japanese Patent Application Publication No. 2022-123431, a first manual handle operation on a door in a state of being locked releases the door lock of the door.

Then, a second handle operation immediately following the first handle operation causes the door to open.

On the other hand, when a predetermined time elapses without the door handle lever being operated with a manual operation after the first handle operation, an automatic changeover mechanism is activated to cause the door to return from an unlocked state to a locked state.

As described, in the case of Japanese Patent Application Publication No. 2022-123431, a condition for the automatic changeover mechanism to be activated while a door handle lever is operated manually is that the predetermined time period has elapsed since the first operation.

However, a too short time specified for the predetermined time period may result in cases where the door cannot be opened, and a too long time specified for the predetermined time period may result in cases where the door is opened due to a careless second handle operation.

In other words, the method proposed in Japanese Patent Application Publication No. 2022-123431 has room for improvement in terms of preventing the mischief of children (so called "child lock") and enhancing theft deterrence.

The present disclosure is directed to a vehicle door lock device which, while refraining a door from being opened by a careless handle operation, allows to open the door when opening the door is actually intended.

The disclosure furthermore contributes to fostering sustainable transportation systems.

Solution

To achieve the aim, a vehicle door lock device according to an embodiment includes: a mechanical changeover mechanism switchable between a mechanical lock mode in which a motion of a door handle lever is not transmitted to a latch and a mechanical unlock mode in which the motion of the door handle lever is transmitted to the latch; an actuator capable of causing the mechanical changeover mechanism to switch from the mechanical unlock mode to the mechanical lock mode; and a controller configured to control the actuator, wherein the controller is configured to, when the controller has determined that any one of a plurality of conditions for re-locking is met and the mechanical changeover mechanism has switched from the mechanical lock mode to the mechanical unlock mode, immediately activate the actuator to cause the mechanical changeover mechanism to switch from the mechanical unlock mode to the mechanical lock mode.

Advantageous Effects

The vehicle door lock device of the embodiment, while refraining a door from being opened by a careless handle operation, allows to open the door when opening the door is actually intended.

The embodiment furthermore contributes to fostering sustainable transportation systems.

DETAILED DESCRIPTION OF EMBODIMENT

Figure 1:
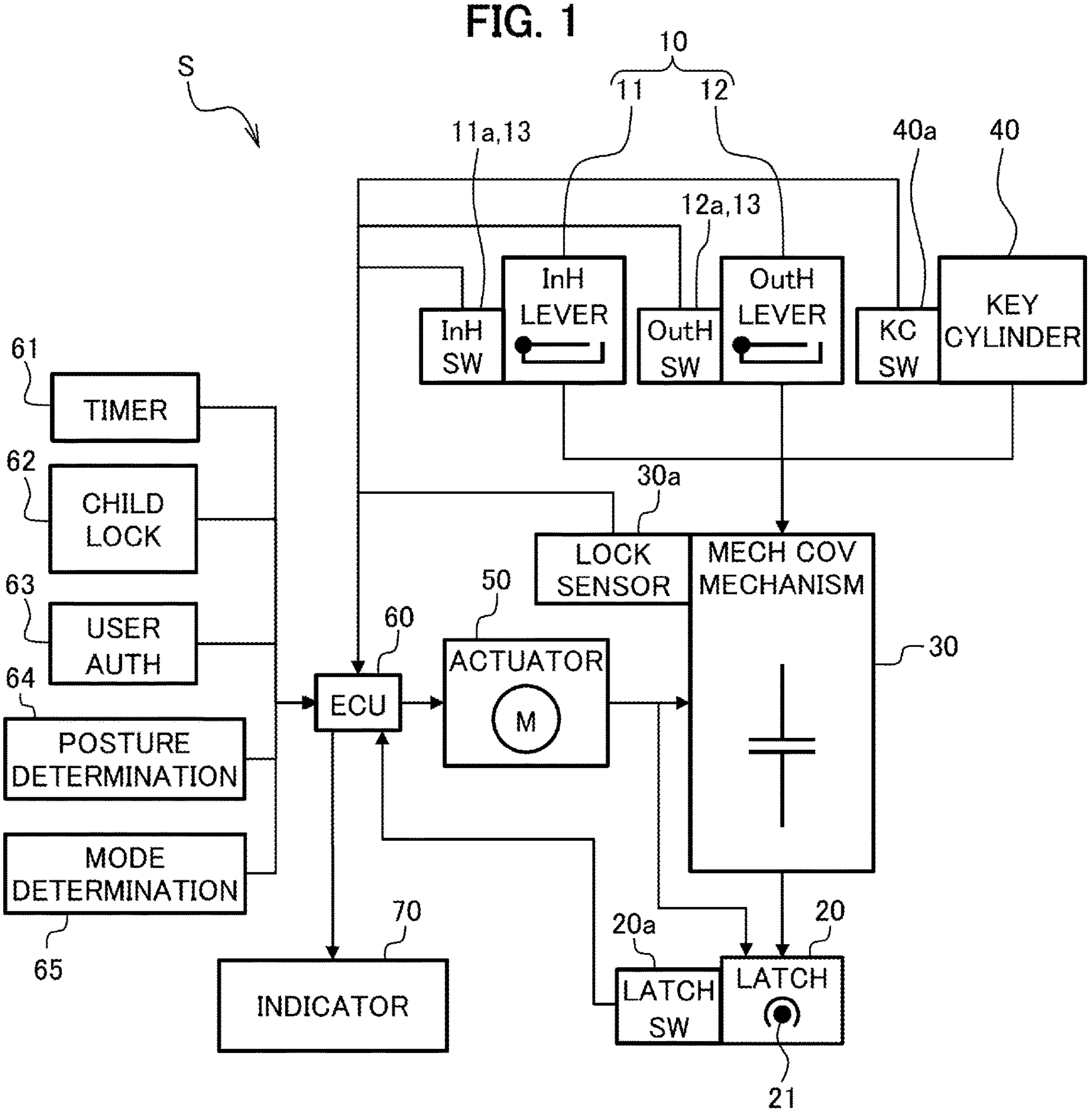
FIG. 1 is a schematic diagram illustrating the configuration of a vehicle door lock device of an embodiment.

A vehicle door lock device of an embodiment of the present disclosure is described in detail with reference to FIGS. 1 to 5.

Note that, in the description, the same component is denoted with the same reference numeral and overlapping description is omitted.

A vehicle door lock device DR of the present embodiment is installed in a door (not shown) configured to open and close an entrance/exit opening (not shown) that opens in a lateral side of a vehicle.

The door (not shown) is a so-called hinged door. The door has a front edge portion supported via a hinge by a front edge portion of the entrance/exit opening. The door swings around the hinge.

The vehicle door lock device DR of the present embodiment includes: door handle levers 10; a latch 20; a mechanical changeover mechanism 30; a key cylinder 40; an actuator 50; and a controller 60 (see FIG. 1).

Note that the vehicle door lock device DR of the present embodiment further includes: a manual lock structure and an electrically powered lock structure.

The manual lock structure also serves as a structure for opening the door manually, i.e., structure for releasing the latch 20 manually (a manual latch release structure)

The manual lock structure is configured to lock the door by mechanically breaking engagement in the manual latch release structure.

The electrically powered lock structure disconnects an electric connection so that a mechanism for opening the door with an electrical power, i.e., a mechanism for releasing the latch 20 with an electrical power (electrically powered latch release structure), do not function, thereby to lock the door.

In the following description, the manual lock structure is mainly described.

The door handle levers 10 (see FIGS. 1 to 4) are operational members for manually releasing the door lock.

An inner handle lever 11 (indoor door handle lever) and an outer handle lever 12 are installed for each door as the door handle levers 10.

The inner handle lever 11 (indoor door handle lever) is an operational member for manually releasing the door lock from inside the vehicle to open the door. The inner handle lever 11 is installed in an inner panel (not shown) that constitutes an inner face of the door.

Each inner handle lever 11 is provided with an inner handle switch 11*a* that switches between ON and OFF in conjunction with a handle operation.

The outer handle lever 12 is an operational member for opening the door from outside the vehicle. The outer handle lever 12 is installed in an outer panel (not shown) that constitutes an outer face of the door.

Each outer handle lever 12 is provided with an outer handle switch 12*a* that switches between ON and OFF in conjunction with a handle operation.

Herein, the inner handle switch 11*a* and the outer handle switch 12*a* are collectively referred to as a handle switch(es) 13.

Based on a signal output from the handle switch(es) 13, determination is made as to which one of the inner handle lever 11 and outer handle lever 12 is being operated.

Note that, herein, a door handle operation for opening the door is referred to as a door opening operation.

The latch 20 is installed in a rear edge portion of each door and is configured to be capable of engaging and disengaging with a striker 21 provided projecting from the entrance/exit opening.

The latch 20 is configured to be capable of being transitioned between an engaged state and a disengaged state (see FIGS. 1 to 4).

Figure 2:
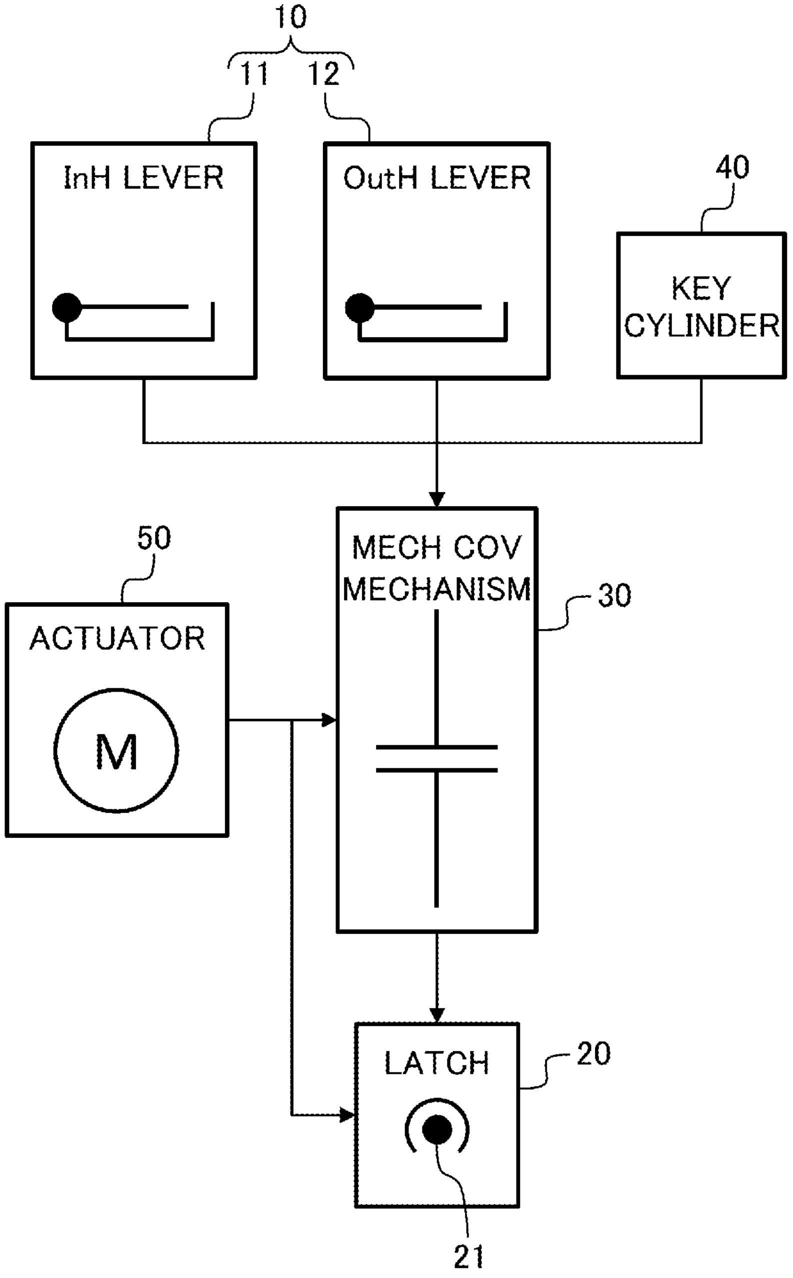
FIG. 2 is a schematic diagram illustrating the vehicle door lock device in a door locked state.
Figure 3:
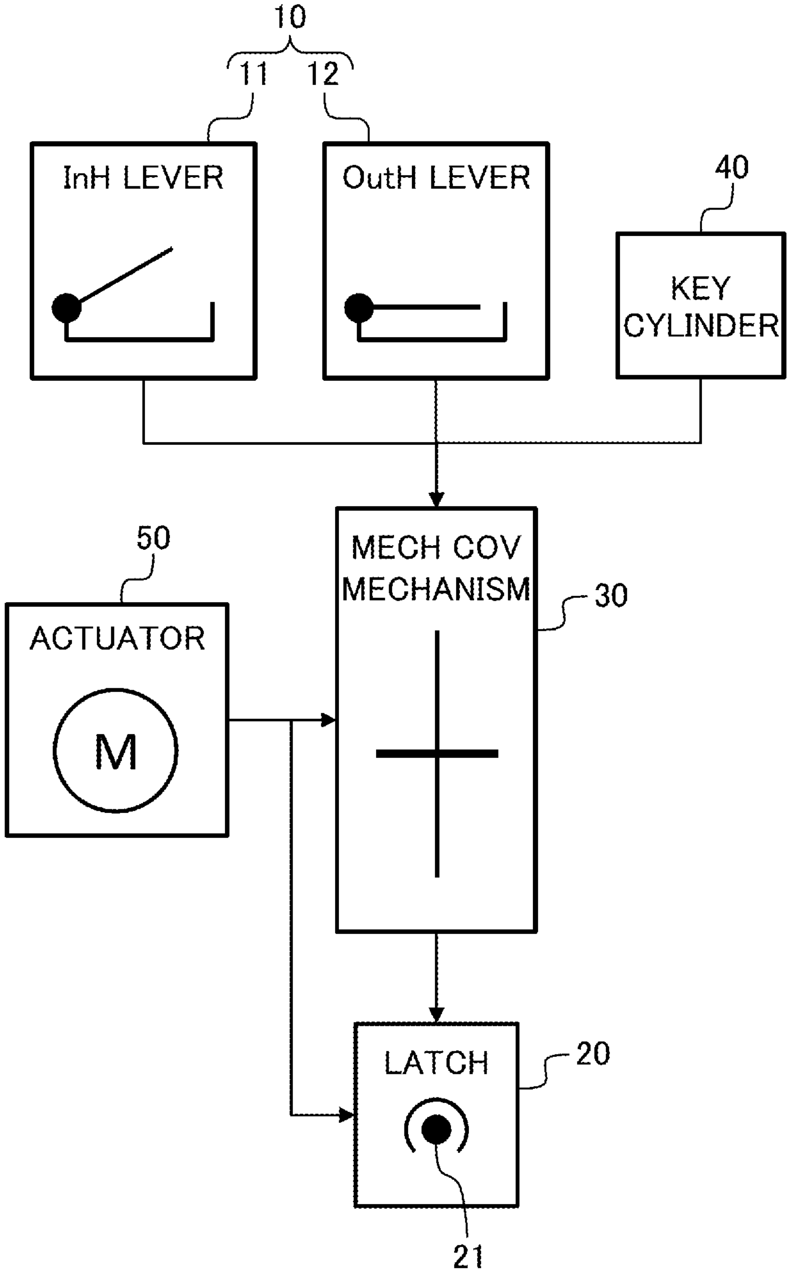
FIG. 3 is a schematic diagram illustrating the vehicle door lock device in a door unlocked state.

In an engaged state, the latch 20 engages with the striker 21 with the door being closed and the engagement between the latch 20 and the striker 21 is kept (see FIGS. 1 to 3).

With this, the state where the door is closed is kept.

Figure 4:
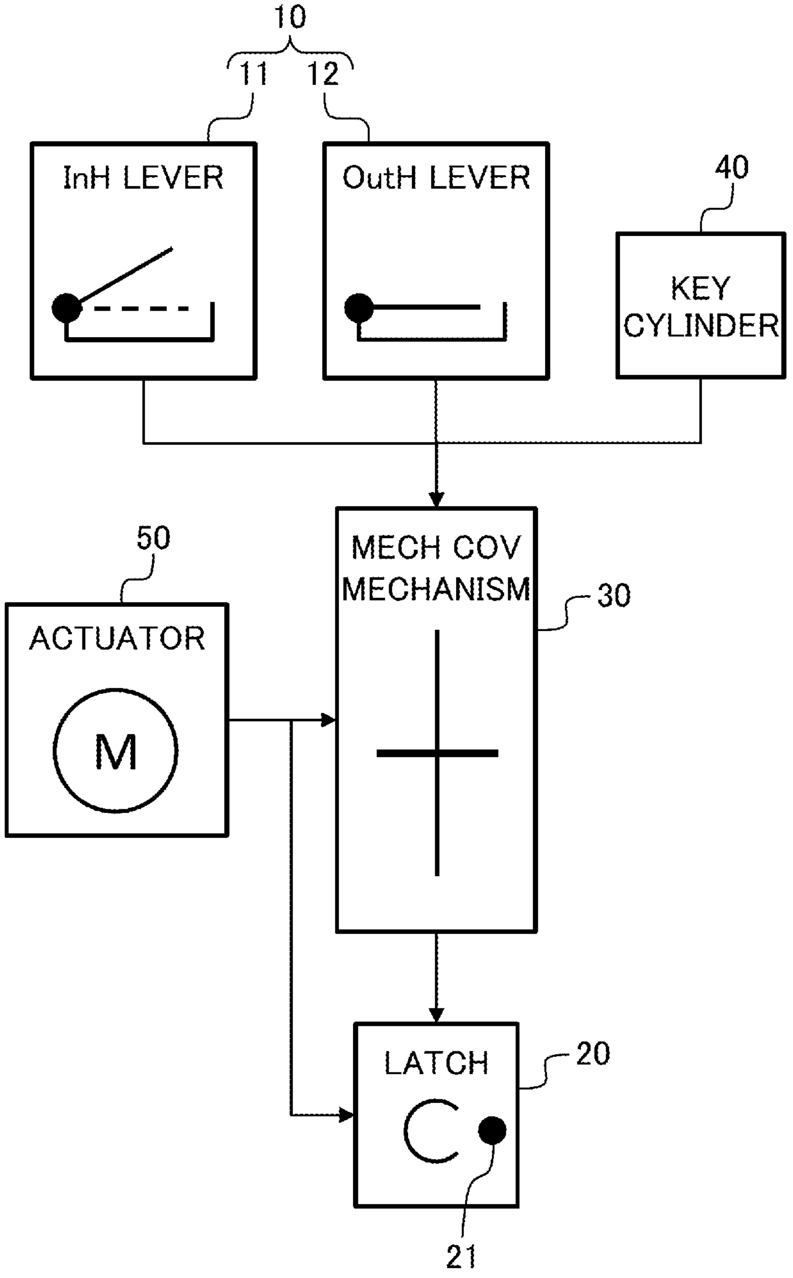
FIG. 4 is a schematic diagram illustrating the vehicle door lock device in a state where the door is opened.

In a disengaged state, the engagement of the latch 20 with the striker 21 has been released (see FIG. 4).

With this, the door is in a state of being capable of being opened or closed as desired.

Closing the door causes the latch 20 in a disengaged state to transition to an engaged state due to an engagement with the striker 21.

The transition of the latch 20 from an engaged state to a disengaged state is caused by the mechanical changeover mechanism 30 in cases of manual operations and is caused by the actuator 50 in cases of electronic operations.

The latch 20 is provided with a latch switch 20*a* that switches between ON and OFF in conjunction with the transition between the engaged state and the disengaged state.

The mechanical changeover mechanism 30 is a structure for mechanically linking the door handle lever 10 and the latch 20 to transmit the motion of the door handle lever 10 by a door opening operation to the latch 20. The mechanical changeover mechanism 30 is provided for each door (see FIGS. 1 to 4)

The mechanical changeover mechanism 30 transmits the motion of the door handle lever 10 by a door opening operation to the latch 20 with a combination of links (not shown), cams (not shown) and the like.

The mechanical changeover mechanism 30 is configured to be selectively switchable between a mechanical lock mode in which the motion of the door handle lever 10 is not transmitted to the latch 20 and a mechanical unlock mode in which the motion of the door handle lever 10 is transmitted to the latch 20.

In the mechanical lock mode, as a linkage in the mechanical changeover mechanism 30 are disengaged so that the motion of the door handle lever 10 is not transmitted to the latch 20, the door is in a state of being locked.

Due to this, the user cannot open the door even when the user operates the door handle lever 10 once.

Then, a switch from the mechanical lock mode to the mechanical unlock mode is performed by operating the inner handle lever 11.

Note that the switch from the mechanical lock mode to the mechanical unlock mode (i.e., release of door lock) through an outer handle operation is prohibited for theft deterrence and security reasons.

To cause the mechanical changeover mechanism 30 to switch from the mechanical lock mode to the mechanical unlock mode from outside the vehicle, an operation or the like of the later-described key cylinder 40 or remote control key is to be performed.

In the mechanical unlock mode, as the linkage in the mechanical changeover mechanism 30 is formed, the motion of the door handle lever 10 is transmitted to the latch 20.

In other words, when the mechanical changeover mechanism 30 is in a state of having switched to the mechanical unlock mode, the lock of the door is released and the user is able to open the door by operating the door handle lever 10.

Therefore, in a door locked state (in a state where the mechanical changeover mechanism 30 is in the mechanical lock mode), the user can open the door by operating the inner handle lever 11 twice consecutively.

Note that in a state where the lock of the door has been released, the door can be opened by operating either the inner handle lever 11 or the outer handle lever 12.

Note that the switch from the mechanical unlock mode to the mechanical lock mode is performed by an actuator.

A switch from the mechanical unlock mode to the mechanical lock mode after the door has been opened is to be performed according to a door lock operation by a user operating a remote control key, the key cylinder, or a handle switch.

The mechanical changeover mechanism 30 is provided with a lock sensor 30*a* that switches between ON and OFF in conjunction with the switch between the mechanical lock mode and the mechanical unlock mode.

Note that the linkage between the mechanical changeover mechanism 30 and the latch 20 is configured such that the motion from the mechanical changeover mechanism 30 to the latch 20 is transmitted but the motion from the latch 20 to the mechanical changeover mechanism 30 is always not transmitted.

The key cylinder 40 is installed in the vicinity of the outer handle lever 12 in the outer panel.

The key cylinder 40 is to be operated by the user using a key (not shown) carried by the user.

The user can cause the mechanical changeover mechanism 30 to switch between the mechanical lock mode and the mechanical unlock mode by operating the key cylinder 40.

The key cylinder 40 is provided with a key cylinder switch 40*a* that switches between ON and OFF in conjunction with an operation for locking/unlocking the lock by means of the key.

Note that hereinafter an operation for locking/unlocking the lock by a dedicated key is referred to as a key operation.

Note also that the key cylinder 40 is capable of causing the mechanical changeover mechanism 30 to switch the operation mode of the mechanical changeover mechanism 30 but is not capable of causing the latch 20 to transition from an engaged state to a disengaged state.

The actuator 50 serves to cause the mechanical changeover mechanism 30 to switch from the mechanical unlock mode to the mechanical lock mode in a manual operation and to cause the latch 20 to transition from an engaged state to a disengaged state in an electronic operation (see FIGS. 1 to 4)

The actuator 50 is provided for each door.

Actions to be performed by the actuator 50 is controlled by the controller 60.

The actuator 50 is driven by an electrical motor (not shown) controlled by the controller 60.

The controller 60 controls the actions to be performed by the actuator 50 based on output signals output from various sensors, switches, and the like, separately for each door (see FIGS. 1 to 4).

The controller 60 receives the output signals output from the above-mentioned handle switches 13 (inner handle switch 11*a*, outer handle switch 12*a*), latch switch 20*a*, lock sensor 30*a*, and key cylinder switch 40*a*.

The controller 60 also receives output signals output from a timer unit 61, a child lock unit 62, a user authentication unit 63, an posture determination unit 64, and a mode determination unit 65.

The controller 60 is provided with an indicator 70 on which states of the vehicle door lock device DR are displayed, which states include information on the current operation mode of the mechanical changeover mechanism 30 and the states of electronic locks.

The controller 60, upon determining that a condition for re-locking has been met, drives the actuator 50 to cause the mechanical changeover mechanism 30 to switch from the mechanical unlock mode to the mechanical lock mode, i.e., to lock the door. Note that, in this disclosure, the term "re-lock" means to cause the door to transition to a state of being locked, by causing the mechanical changeover mechanism 30 in the mechanical unlock mode to switch to the mechanical lock mode.

The controller 60, upon determining that the user has requested releasing the latch with an electronic operation, drives the actuator 50 to cause the latch 20 to transition from an engaged state to a disengaged state.

The controller 60, upon determining that the user has requested releasing the latch with an electronic operation but an electronic lock is currently in effect, does not drive the actuator 50 and maintains the latch 20 in an engaged state.

The controller 60, upon determining that the key cylinder 40 has been operated by a dedicated key when the operation mode of the mechanical changeover mechanism 30 has been switched, the controller 60 maintains the mechanical changeover mechanism 30 in the operation mode after being switched.

The timer unit 61 outputs an output signal indicative of a post-switching elapsed time period representing the time elapsed since the operation mode of the mechanical changeover mechanism 30 has switched from the mechanical lock mode to the mechanical unlock mode.

The controller 60 determines whether the received post-switching elapsed time period has reached a set monitoring time period.

The controller 60, upon determining that the post-switching elapsed time period has reached the set monitoring time period, drives the actuator 50 to cause the mechanical changeover mechanism 30 to switch from the mechanical unlock mode to the mechanical lock mode.

The child lock unit 62 outputs a switch-prohibiting signal that prohibits causing the mechanical changeover mechanism 30 to switch from the mechanical lock mode to the mechanical unlock mode in response to a door opening operation using the inner handle lever 11. That is, the switch-prohibiting signal indicates that a child lock is set to ON.

The child lock can be set for each door.

It means that, for a door for which the child lock has not been set to ON, the mechanical changeover mechanism 30 of the door can be caused to switch from the mechanical lock mode to the mechanical unlock mode by a door opening operation using the inner handle lever 11.

For a door for which the child lock has been set to ON, when the mechanical changeover mechanism 30 has switched to the mechanical unlock mode according to an operation by the inner handle lever 11, the controller 60 causes the mechanical changeover mechanism 30 to switch from the mechanical unlock mode to the mechanical lock mode without waiting for expiration of the monitoring time period.

For a door for which the child lock has not been set to ON, when the mechanical changeover mechanism 30 has switched to the mechanical unlock mode, the controller 60 maintains the mechanical changeover mechanism 30 in the mechanical unlock mode.

When user authentication by the user authentication unit 63 succeeds, the user authentication unit 63 outputs a signal indicative of the success of the user authentication, which indicates presence of an authorized user in the vicinity of the vehicle.

The result of user authentication is used by the vehicle door lock device DR to determine whether to perform re-locking.

When, in a state where the controller 60 has confirmed the presence of the authorized user in the vicinity of the vehicle, the mechanical changeover mechanism 30 has switched to the mechanical unlock mode, the controller 60 determines that the switching is by an unlock operation by the authorized user and maintains the mechanical unlock mode.

When, in a state where the controller 60 has not confirmed the presence of the authorized user in the vicinity of the vehicle, the mechanical changeover mechanism 30 has switched to the mechanical unlock mode, the controller 60 determines that the switching is by an unauthorized unlock operation and causes the mechanical changeover mechanism 30 to switch to the mechanical lock mode without waiting for expiration of the monitoring time period.

The posture determination unit 64 outputs a signal indicative of the tilt angle of the vehicle as a result of posture determination.

The result of the posture determination is used by the vehicle door lock device DR to determine whether to perform re-locking.

The controller 60 compares the vehicle tilt angle stored at the time of the previous posture determination and the vehicle tilt angle currently received.

When, in a state where the controller 60 has confirmed a change in the posture (angle) of the vehicle body, the mechanical changeover mechanism 30 has switched to the mechanical unlock mode, the controller 60 immediately causes the mechanical changeover mechanism 30 to switch to the mechanical lock mode without waiting for expiration of the monitoring time period.

For example, as the posture of the vehicle body frequently varies while the vehicle is traveling, when the mechanical changeover mechanism 30 has switched from the mechanical lock mode to the mechanical unlock mode while the vehicle is traveling, the controller 60 immediately causes the mechanical changeover mechanism 30 to switch to the mechanical lock mode.

As a result, even when a careless handle operation is performed while the vehicle is traveling, the door is kept locked.

When, in a state where the vehicle is stopped, the mechanical changeover mechanism 30 has switched from the mechanical lock mode to the mechanical unlock mode, the controller 60 determines, based on the output from the mode determination unit 65, whether the switching is an unauthorized action on the vehicle or an action for maintenance of the vehicle.

Note that the controller 60 updates the stored vehicle tilt angle with the latest value each time posture determination is performed.

However, in a state where the vehicle is parked with the ignition being off, the controller 60 may keep the tilt angle of the vehicle body stored at the time of the leave of the authorized user from the vehicle without updating and perform next posture determination.

In such posture determinations, even after re-locking based on the determination that the posture of the vehicle has changed while the vehicle is parked, the controller 60 repeatedly performs posture determination with respect to the tilt angle stored at the time of parking the vehicle, not to the tilt angle at the time of re-locking.

The mode determination unit 65 performs mode determination and outputs a signal representing the control mode currently set.

Note that the mode determination in the case of the present embodiment is not to check the condition for re-locking independently but to classify the cases in the above-described posture determination.

In the case of the present embodiment, a lock control mode and an unlock control mode are defined as control modes.

The lock control mode is a control mode for holding the mechanical changeover mechanism 30 in the mechanical lock mode.

The lock control mode is selected mainly in the regular use by an authorized user, e.g., when the authorized user drives the vehicle to cause the vehicle to travel.

When, in a state where the lock control mode is selected, a change in the posture (tilt angle) of the vehicle body is detected and the mechanical changeover mechanism 30 has switched to the mechanical unlock mode, the controller 60 immediately causes the mechanical changeover mechanism 30 to switch to the mechanical lock mode.

The unlock control mode is a control mode that prohibits the mechanical changeover mechanism 30 from switching from the mechanical unlock mode to the mechanical lock mode.

In the unlock control mode, even when a change in the posture of the vehicle body is detected, the mechanical changeover mechanism 30 is held in the current operation mode and a switch from the mechanical lock mode to the mechanical unlock mode is permitted.

Therefore, in the unlock control mode, as a switch to the mechanical lock mode does not occur even when a change in the posture (tilt angle) of the vehicle body occurs, mechanical locking at unintentional timing of the user is prevented.

Such unlock control mode is selected mainly during vehicle maintenance, such as when exchanging tires, in a situation where a change in the angle of the vehicle body is anticipated.

Note that, in the case of the present embodiment, although the two control modes of the lock control mode and the unlock control mode are defined, other control modes may be defined other than the two control modes.

For example, a forced lock release control mode where the mechanical changeover mechanism 30 is held forcibly in the mechanical unlock mode may be implemented.

When such a control mode is set, the mechanical changeover mechanisms 30 of all the doors are switched to the mechanical unlock mode.

The forced lock release control mode is preferable, for example, for a case where the locks of all the doors are to be released at once.

Next, a description will be given of how the vehicle door lock device DR specifically works, using a flowchart (see FIG. 5).

Note that the flowchart represents processing to be repeated with a predetermined cycle for each door.

In other words, the determination result for one door is only used as a basis for switching the operation mode of the mechanical changeover mechanism 30 of that door and is not used as a basis for switching the operation mode of the mechanical changeover mechanism 30 of another door.

The controller 60 having started control first, in step S101, determines whether a key operation using a dedicated key has been performed on the key cylinder 40.

When the controller 60 has determined that a key operation using a dedicated key has been performed, the controller 60 interprets the key operation as an unlock operation in an emergency and terminates the routine regardless of the operation mode to which the mechanical changeover mechanism 30 has switched.

When the controller 60 has determined that a key operation using a dedicated key has not been performed on the key cylinder 40, the controller 60 proceeds to step S102.

In step S102, the controller 60 determines whether the tilt angle of the vehicle has changed, based on the output signal of the posture determination unit 64.

When the controller 60 determines, based on the result of comparison with the stored vehicle tilt angle, that the tilt angle of the vehicle has changed, the controller 60 proceeds to step S109.

Upon determining that the tilt angle of the vehicle has not changed, the controller 60 proceeds to step S103.

In step S103, the controller 60 determines whether the child lock is set to ON or OFF, based on the output signal of the child lock unit 62.

Upon determining that the child lock is set to ON, the controller 60 proceeds to step S108.

Upon determining that the child lock is not set to ON, i.e., upon determining that the child lock is set to OFF, the controller 60 proceeds to step S104.

In step S104, the controller 60 determines whether the current user is an authorized user, based on the output signal of the user authentication unit 63.

Upon determining that the current user is an authorized user, the controller 60 proceeds to step S105.

Upon determining that the current user is not an authorized user, the controller 60 proceeds to step S110.

In step S105, the controller 60 determines whether the mechanical changeover mechanism 30 is currently in the mechanical unlock mode.

Note that, in this step, the controller 60 determines whether the current operation mode is the mechanical lock mode, rather than detecting a transition from the mechanical lock mode to the mechanical unlock mode.

Upon determining that the current operation mode is not mechanical unlock mode (i.e., upon determining that the current operation mode is the mechanical lock mode), the controller 60 terminates the routine.

Upon determining that the current operation mode is the mechanical unlock mode, the controller 60 proceeds to step S106.

In step S106, the controller 60 determines, based on the output signal of the timer unit 61, whether the post-switching elapsed time period, representing the time elapsed since the mechanical changeover mechanism 30 has switched to the mechanical unlock mode, has reached the set monitoring time period, i.e., whether the monitoring time period has expired.

Upon determining that the monitoring time period has expired, the controller 60 proceeds to step S107.

Upon determining that the monitoring time period has not expired, the controller 60 returns to step S101.

In step S107, the controller 60 activates the actuator 50 to cause the mechanical changeover mechanism 30 to switch from the mechanical unlock mode to the mechanical lock mode and then terminates the routine. That is, the controller 60 performs re-locking and then terminates the routine.

In step S108, the controller 60 determines whether the inner handle lever 11 has been operated.

Upon determining that the inner handle lever 11 has been operated, the controller 60 becomes aware that the inner handle lever 11 of a door for which the child lock is set to ON has been operated and proceeds to step S110.

Upon determining that the inner handle lever 11 has not been operated, the controller 60 proceeds to step S104.

In step S109, in a state where the controller 60 has confirmed a change in the tilt angle, the controller 60 determines the current control mode based on the output signal of the mode determination unit 65.

Upon determining that the current control mode is the unlock control mode, the controller 60 terminates the routine.

Upon determining that the current control mode is not the unlock control mode (i.e., the current control mode is the lock control mode), the controller 60 proceeds to step S110.

In step S110, the controller 60 determines whether the mechanical changeover mechanism 30 is currently in the mechanical unlock mode.

Note that here, like step S105, the controller 60 determines whether the mechanical changeover mechanism 30 is currently in the mechanical unlock mode, rather than detecting a transition from the mechanical lock mode to the mechanical unlock mode.

Upon determining that the mechanical changeover mechanism 30 is currently not in the mechanical unlock mode (upon determining that the mechanical changeover mechanism 30 is currently in the mechanical lock mode), the controller 60 terminates the routine.

Upon determining that the mechanical changeover mechanism 30 is currently in the mechanical unlock mode, the controller 60 proceeds to step S111.

In step S111, the controller 60, which is now aware that a condition for re-locking is met, activates the actuator 50 to cause the mechanical changeover mechanism 30 to switch from the mechanical unlock mode to the mechanical lock mode, and then terminates the routine. That is, the controller 60 performs re-locking and then terminates the routine.

Next, a description will be given of the working effects of the present embodiment.

A plurality of conditions for re-locking, which is to be checked by the vehicle door lock device DR of the present embodiment, are defined.

Upon determining that any one of the plurality of conditions for re-locking is met and that the mechanical changeover mechanism 30 has switched from the mechanical lock mode to the mechanical unlock mode, the controller 60 immediately activates the actuator 50 to switch the operation mode from the mechanical unlock mode to the mechanical lock mode.

With this, while refraining doors from being opened by a careless handle operation of a user, the user is allowed to open a door when desired.

As the actuator 50 is used to cause the mechanical changeover mechanism 30 to switch from the mechanical unlock mode to the mechanical lock mode, it is not necessary to provide a dedicated link structure for each condition for re-locking. This simplifies the overall structure of the device.

The vehicle door lock device DR of the present embodiment monitors, separately from the plurality of conditions for re-locking, expiration of a monitoring time period since the mechanical changeover mechanism 30 has switched from the mechanical lock mode to the mechanical unlock mode Upon determining that the monitoring time period has expired, the controller 60 immediately activates the actuator 50 to cause the mechanical changeover mechanism 30 to switch from the mechanical unlock mode to the mechanical lock mode.

When the controller 60 determines that one or more of the plurality of conditions for re-locking is met before the monitoring time period has expired, the controller 60 immediately activates the actuator 50 to cause the mechanical changeover mechanism 30 to switch from the mechanical unlock mode to the mechanical lock mode.

With this configuration, if no second handle operation is performed after the mechanical changeover mechanism 30 has switched from the mechanical lock mode to the mechanical unlock mode, the mechanical changeover mechanism 30 is switched to the mechanical lock mode after the monitoring time period has expired.

In addition, when the mechanical changeover mechanism 30 has switched from the mechanical lock mode to the mechanical unlock mode and after that a condition for re-locking is met, the mechanical changeover mechanism 30 is immediately switched to the mechanical lock mode.

This prevents the mechanical changeover mechanism 30 from continuing the mechanical unlock mode for a time longer than a time necessary for opening the door and refrains the door from being opened in a situation where it is not proper to open the door (i.e., situation where a condition for re-locking is met).

In the case of the vehicle door lock device DR of the present embodiment, one of the plurality of conditions for re-locking is that a child lock, which prohibits the mechanical changeover mechanism 30 from switching to the mechanical unlock mode, has been set to ON.

The child lock can be set for each door.

When the controller 60 determines that, for a door for which the child lock has been set to ON, the mechanical changeover mechanism 30 has switched to the mechanical unlock mode according to an operation performed on the inner handle lever 11 (indoor door handle lever), the controller 60 immediately activates the actuator 50 to cause the mechanical changeover mechanism 30 to switch from the mechanical unlock mode to the mechanical lock mode.

This configuration eliminates the need of a link structure that restricts the transition from the mechanical lock mode to the mechanical unlock mode.

That is, a link structure for the so-called child lock can be eliminated.

With this, while simplifying the mechanical changeover mechanism 30, the vehicle door lock device DR can be multifunctional.

In the case of the vehicle door lock device DR of the present embodiment, one of the plurality of conditions for re-locking is that the current user is not an authorized user.

When the controller 60 has not received from the user authentication unit 63 a signal indicative of a success of the user authentication and thus determines that the current user is not an authorized user and that the operation mode of the mechanical changeover mechanism 30 has switched from the mechanical lock mode to the mechanical unlock mode, the controller 60 immediately activates the actuator 50 to cause the mechanical changeover mechanism 30 to switch from the mechanical unlock mode to the mechanical lock mode.

This configuration prevents a person other than the authorized user(s) from performing an unlock operation (an unauthorized unlock operation), improving the theft deterrence.

In the case of the vehicle door lock device DR of the present embodiment, one of the plurality of conditions for re-locking is that the tilt angle of the vehicle has changed.

When the controller 60 determines, based on the signal indicative of the result of posture determination, received from the posture determination unit 64, that the tilt angle of the vehicle has changed and that the mechanical changeover mechanism 30 has switched from the mechanical lock mode to the mechanical unlock mode, the controller 60 immediately activates the actuator 50 to cause the mechanical changeover mechanism 30 to switch from the mechanical unlock mode to the mechanical lock mode.

It is considered that, when the tilt angle of the vehicle has changed in a state where the vehicle is stopped, some action may have possibly been performed on the vehicle to perform an unauthorized unlock operation so-called picking.

Switching to the mechanical lock mode in this situation improves the theft deterrence.

While the vehicle is traveling, the tilt angle of the vehicle is always changing due to the acceleration/deceleration and the unevenness of the road surface.

Thus, even when the door handle lever 10 is operated while the vehicle is traveling so that the mechanical changeover mechanism 30 is switched to the mechanical unlock mode, as the mechanical changeover mechanism 30 is immediately switched to the mechanical lock mode, the door will not open while the vehicle is traveling. This improves the safety performance.

The vehicle door lock device DR of the present embodiment implements a plurality of control modes including the unlock control mode.

When the unlock control mode is not currently selected (when the lock control mode is currently selected) and the controller 60 determines that the tilt angle of the vehicle has changed and that the mechanical changeover mechanism 30 has switched from the mechanical lock mode to the mechanical unlock mode, the controller 60 immediately causes the mechanical changeover mechanism 30 to switch from the mechanical unlock mode to the mechanical lock mode.

When the unlock control mode is currently selected and the controller 60 determines that the tilt angle of the vehicle has changed and that the mechanical changeover mechanism 30 has switched from the mechanical lock mode to the mechanical unlock mode, the controller 60 maintains the mechanical changeover mechanism 30 in the mechanical unlock mode With this configuration, a transition to the mechanical lock mode does not occur in response to a change in the posture of the vehicle in a state where the vehicle is stopped, in a case other than unauthorized unlock operations such as picking, e.g., during vehicle maintenance.

With this, convenience for vehicle maintenance will be improved.

Figure 5:
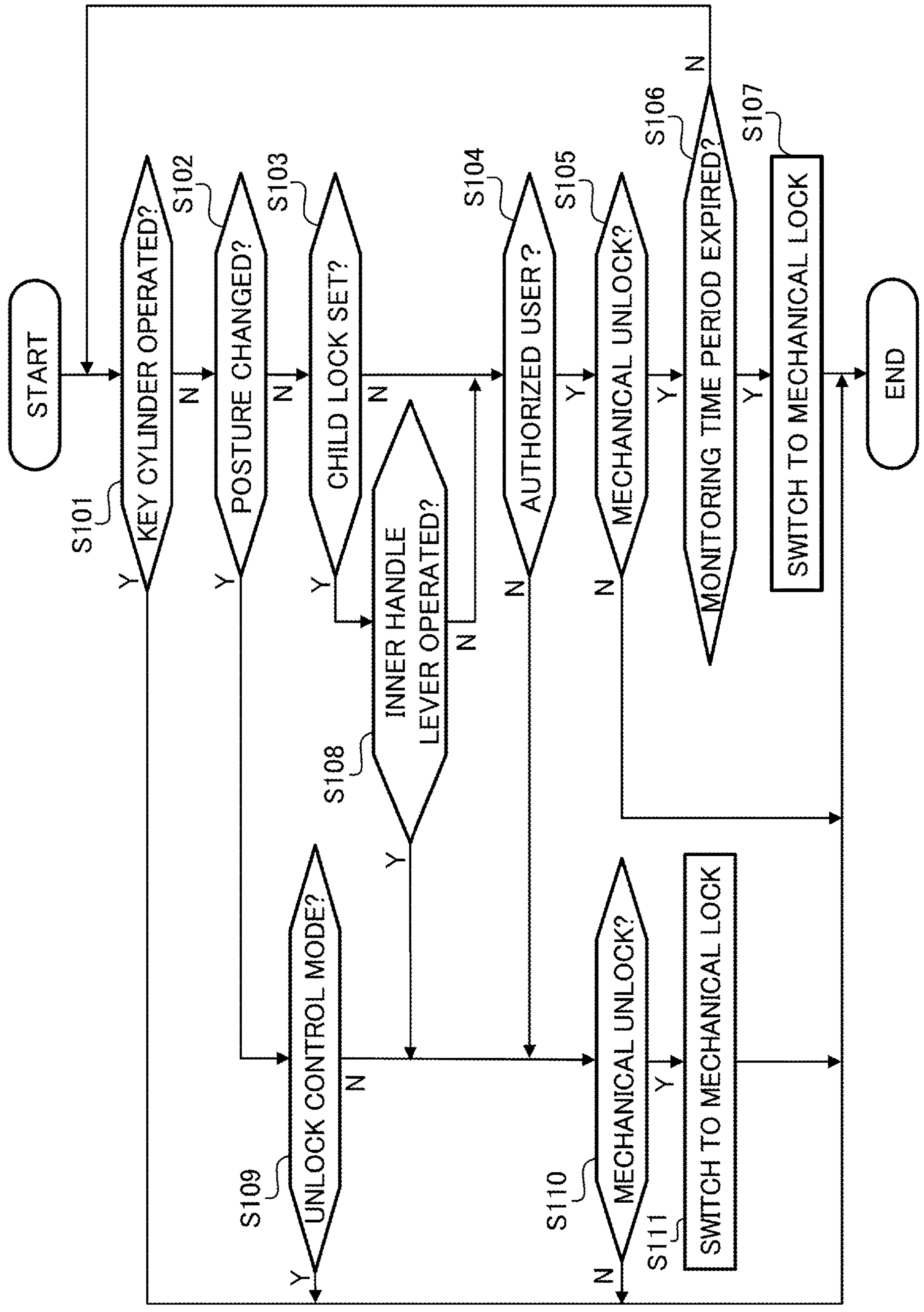
FIG. 5 is a flowchart illustrating the routine to be performed by a controller.

Note that, in the case of the present embodiment, the routine represented by the flowchart shown in FIG. 5 is repeated with a predetermined cycle. However, the invention is not limited to this.

For example, the vehicle door lock device DR may be configured to perform the routine when any one of the inner handle lever 11, outer handle lever 12, and key cylinder 40 is operated.

Even with this configuration, the same effects are obtained as the above-described embodiment.

With this configuration, as the number of executions of the routine is reduced, the power consumption will be reduced.

In the case of the present embodiment, the one actuator 50 is used to switch the operation mode of the mechanical changeover mechanism 30 and to change the state of the latch 20. However, a dedicated actuator may be provided for each of the mechanical changeover mechanism 30 and the latch 20 to switch the operation mode of the mechanical changeover mechanism 30 and to change the state of the latch 20.

In the case of the present embodiment, the manual latch release structure and the electrically powered latch release structure function separately. However, the manual latch release structure and the electrically powered latch release structure may be configured to function in a coordinated manner.

For examples, it is conceivable to switch the control based on the magnitude of the motion of the inner handle lever 11.

In this case, when the inner handle lever 11 is operated with a small stroke, the controller 60 activates the actuator 50 to cause the latch 20 to transition from an engaged state to a disengaged state, to allow opening the door.

On the other hand, when the inner handle lever 11 is operated with a large stroke, the mechanical changeover mechanism 30 causes the latch 20 to transition from an engaged state to a disengaged state, to allow opening the door.

What is claimed is:

1. A vehicle door lock device for a door of a vehicle, the vehicle door lock device comprising:

a mechanical changeover mechanism switchable between a mechanical lock mode in which a motion of a door handle lever is not transmitted to a latch and a mechanical unlock mode in which the motion of the door handle lever is transmitted to the latch;

an actuator capable of causing the mechanical changeover mechanism to switch from the mechanical unlock mode to the mechanical lock mode; and a controller configured to control the actuator, wherein the controller is configured to:

when the controller has determined that any one of a plurality of conditions for re-locking is met and the mechanical changeover mechanism has switched from the mechanical lock mode to the mechanical unlock mode, immediately activate the actuator to cause the mechanical changeover mechanism to switch from the mechanical unlock mode to the mechanical lock mode, determine whether a predetermined monitoring time period has expired since the mechanical changeover mechanism has switched from the mechanical lock mode to the mechanical unlock mode, upon determining that the predetermined monitoring time period has expired, activate the actuator to cause the mechanical changeover mechanism to switch from the mechanical unlock mode to the mechanical lock mode, and upon determining that one or more of the plurality of conditions for re-locking have been met before the predetermined monitoring time period has expired, immediately activate the actuator to cause the mechanical changeover mechanism to switch from the mechanical unlock mode to the mechanical lock mode.

2. A vehicle door lock device for a door of a vehicle, the vehicle door lock device comprising:

a mechanical changeover mechanism switchable between a mechanical lock mode in which a motion of a door handle lever is not transmitted to a latch and a mechanical unlock mode in which the motion of the door handle lever is transmitted to the latch;

an actuator capable of causing the mechanical changeover mechanism to switch from the mechanical unlock mode to the mechanical lock mode; and a controller configured to control the actuator, wherein the controller is configured to, when the controller has determined that any one of a plurality of conditions for re-locking is met and the mechanical changeover mechanism has switched from the mechanical lock mode to the mechanical unlock mode, immediately activate the actuator to cause the mechanical changeover mechanism to switch from the mechanical unlock mode to the mechanical lock mode, wherein one of the plurality of conditions for re-locking is that a child lock, which prohibits the mechanical changeover mechanism from switching to the mechanical unlock mode, is set to ON for the door, and wherein the controller is further configured to, when the controller has determined that the child lock has been set to ON for the door and the mechanical changeover mechanism has switched from the mechanical lock mode to the mechanical unlock mode according to an operation performed on an indoor door handle lever of the door, immediately activate the actuator to cause the mechanical changeover mechanism to switch from the mechanical unlock mode to the mechanical lock mode.

3. The vehicle door lock device according to claim 1, wherein one of the plurality of conditions for re-locking is that a current user is not an authorized user, and wherein the controller is further configured to, when the controller has determined that the current user is not an authorized user and the mechanical changeover mechanism has switched from the mechanical lock mode to the mechanical unlock mode, immediately activate the actuator to cause the mechanical changeover mechanism to switch from the mechanical unlock mode to the mechanical lock mode.

4. The vehicle door lock device according to claim 1, wherein one of the plurality of conditions for re-locking is that a tilt angle of the vehicle has changed, and wherein the controller is further configured to, when the controller has determined that the tilt angle has changed and the mechanical changeover mechanism has switched from the mechanical lock mode to the mechanical unlock mode, immediately activate the actuator to cause the mechanical changeover mechanism to switch from the mechanical unlock mode to the mechanical lock mode.

5. The vehicle door lock device according to claim 4, wherein the controller implements a plurality of control modes including an unlock control mode that prohibits the mechanical changeover mechanism from switching from the mechanical unlock mode to the mechanical lock mode, and wherein the controller is further configured to, while the unlock control mode is selected, when the controller has determined that the tilt angle has changed and the mechanical changeover mechanism has switched from the mechanical lock mode to the mechanical unlock mode, keep the mechanical changeover mechanism in the mechanical unlock mode.

* * * * *